US006657951B1

(12) United States Patent
Carroll et al.

(10) Patent No.: US 6,657,951 B1
(45) Date of Patent: Dec. 2, 2003

(54) BACKUP CRF VLAN

(75) Inventors: David A. Carroll, Apex, NC (US); John K. Fitzgerald, Cary, NC (US); Kara J. Adams, Raleigh, NC (US); Kenneth H. Potter, Jr., Raleigh, NC (US); Gary William Kramling, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/266,198

(22) Filed: Mar. 10, 1999

Related U.S. Application Data

(60) Provisional application No. 60/110,332, filed on Nov. 30, 1998.

(51) Int. Cl.[7] .............................. H04L 1/00; H04L 12/26
(52) U.S. Cl. .................. 370/222; 370/225; 370/244; 370/245; 370/248; 370/250; 370/400; 370/434; 370/445; 370/452; 709/220; 709/229; 709/239; 709/249; 709/251; 714/1
(58) Field of Search ................................. 370/216, 217, 370/218, 222, 225, 228, 244, 245, 248, 250, 400, 401, 406, 409, 434, 445, 447, 452; 709/238, 239, 220, 221, 249, 251, 229; 714/1, 2, 3, 4

(56) References Cited

U.S. PATENT DOCUMENTS

| | | | |
|---|---|---|---|
| 4,823,338 A | 4/1989 | Chan et al. | 370/85 |
| 4,864,559 A | 9/1989 | Perlman | 370/60 |
| 5,018,133 A | 5/1991 | Tsukakoshi et al. | 370/16 |
| 5,027,350 A | 6/1991 | Marshall | 370/85.13 |

(List continued on next page.)

OTHER PUBLICATIONS

Overview of Token Ring Switching, Web, http://www.cisco.com/univercd/cc/td/doc/product/lan/trsrb/overview.htm, Oct. 8, 1998, pp. 1–8.
Radia Perlman, *Interconnections: Bridges and Routes*,1992, pp. 99–125.
Andrew S. Tanenbaum, *Computer Networks, Third Edition*, 1996, pp. 275–318.
The IBM 8209 LAN Bridge, Aamer Latif, Edward J. Rowlance, and R. Holt Adams, May 1992, pp. 28–37.
Understanding Token Ring Switching, Web, http://www-.cisco.com/univercd/cc/tduct/lan/cat3900/c3930ug/token.htm, Oct. 8, 1998, pp. 1–22.
Token Ring Inter–Switch Link Feature Summary, web, http://www.cisco.com/univercd/cc/tare/ios113ed/113t/113_4/trisl.htm, Oct. 8, 1998, pp. 1–26.
Annex K–DTR Concentrator Functional Description, Jul. 31, 1995, pp. K–1–K–22.
Configuring VTP and Virtual LANs, Cisco Systems, Inc., Feb. 27, 1998, pp. 13–1–13–24.

(List continued on next page.)

*Primary Examiner*—Alpus H. Hsu
*Assistant Examiner*—Roberta Stevens
(74) *Attorney, Agent, or Firm*—Cesari and McKenna, LLP

(57) ABSTRACT

A backup CRF VLAN arrangement provides an alternate, redundant path for traffic between undistributed Concentrator Relay Functions (CRFs) located on separate switches interconnected by trunk links of a distributed token ring bridge. The backup CRF virtual local area network (VLAN) arrangement defines a backup network path which may be utilized if a primary active path is not a valid path to a backup network. Notably, the backup network comprises a special type of CRF that is distributed among the switches, but that has only one port active at any given time.

70 Claims, 10 Drawing Sheets

U.S. PATENT DOCUMENTS

| | | | |
|---|---|---|---|
| 5,088,032 A | 2/1992 | Bosack | 395/200 |
| 5,088,090 A | 2/1992 | Yacoby | 370/85.13 |
| 5,095,480 A | 3/1992 | Fenner | 370/94.1 |
| 5,111,453 A | 5/1992 | Morrow | 370/85.13 |
| 5,144,622 A | 9/1992 | Takiyasu et al. | 370/85.13 |
| 5,280,480 A | 1/1994 | Pitt et al. | 370/85.13 |
| 5,309,437 A | 5/1994 | Perlman et al. | 370/85.13 |
| 5,323,394 A | 6/1994 | Perlman | 370/85.13 |
| 5,394,402 A | 2/1995 | Ross | 370/94.1 |
| 5,414,704 A | 5/1995 | Spinney | 370/60 |
| 5,448,565 A | 9/1995 | Chang et al. | 370/85.13 |
| 5,491,687 A | 2/1996 | Christensen et al. | 370/17 |
| 5,500,860 A | 3/1996 | Perlman et al. | 370/85.13 |
| 5,511,168 A | 4/1996 | Perlman et al. | 395/200.15 |
| 5,517,620 A | 5/1996 | Hashimoto et al. | 395/200.15 |
| 5,617,421 A | 4/1997 | Chin et al. | 370/402 |
| 5,623,532 A | 4/1997 | Houde et al. | 379/58 |
| 5,633,858 A | 5/1997 | Chang et al. | 370/255 |
| 5,652,908 A * | 7/1997 | Douglas et al. | 714/4 |
| 5,684,800 A | 11/1997 | Dobbins et al. | 370/401 |
| 5,734,824 A * | 3/1998 | Choi | 709/224 |
| 5,740,171 A | 4/1998 | Mazzola et al. | 370/392 |
| 5,742,604 A | 4/1998 | Edsall et al. | 370/401 |
| 5,752,003 A | 5/1998 | Hart | 395/500 |
| 5,764,636 A | 6/1998 | Edsall | 370/401 |
| 5,796,732 A | 8/1998 | Mazzola et al. | 370/362 |
| 5,818,842 A * | 10/1998 | Burwell et al. | 370/397 |
| 5,852,607 A | 12/1998 | Chin | 370/401 |
| 5,872,783 A | 2/1999 | Chin | 370/392 |
| 6,108,300 A * | 8/2000 | Coile et al. | 370/217 |
| 6,222,820 B1 * | 4/2001 | Hamami | 370/218 |
| 6,421,317 B1 * | 7/2002 | Denecheau et al. | 370/222 |

OTHER PUBLICATIONS

A New Protocol For Route Discovery In Multiple–Ring Networks: Part I—The Basic Protocol, Reuven Cohen, Jun. 25, 1997, pp. 488–498.

Draft Standard for Virtual Bridged Local Area Networks, LAN MAN Standards Committee, Feb. 1997, pp. 1–88.

Cisco VLAN Roadmap, web http://www.cisco.com/warp/public/538/.htm, Jul. 15, 1998, pp. 1–9.

Cisco Announces Token–Ring Switching Products, Apr. 15, 1995, pp. 4–5.

* cited by examiner

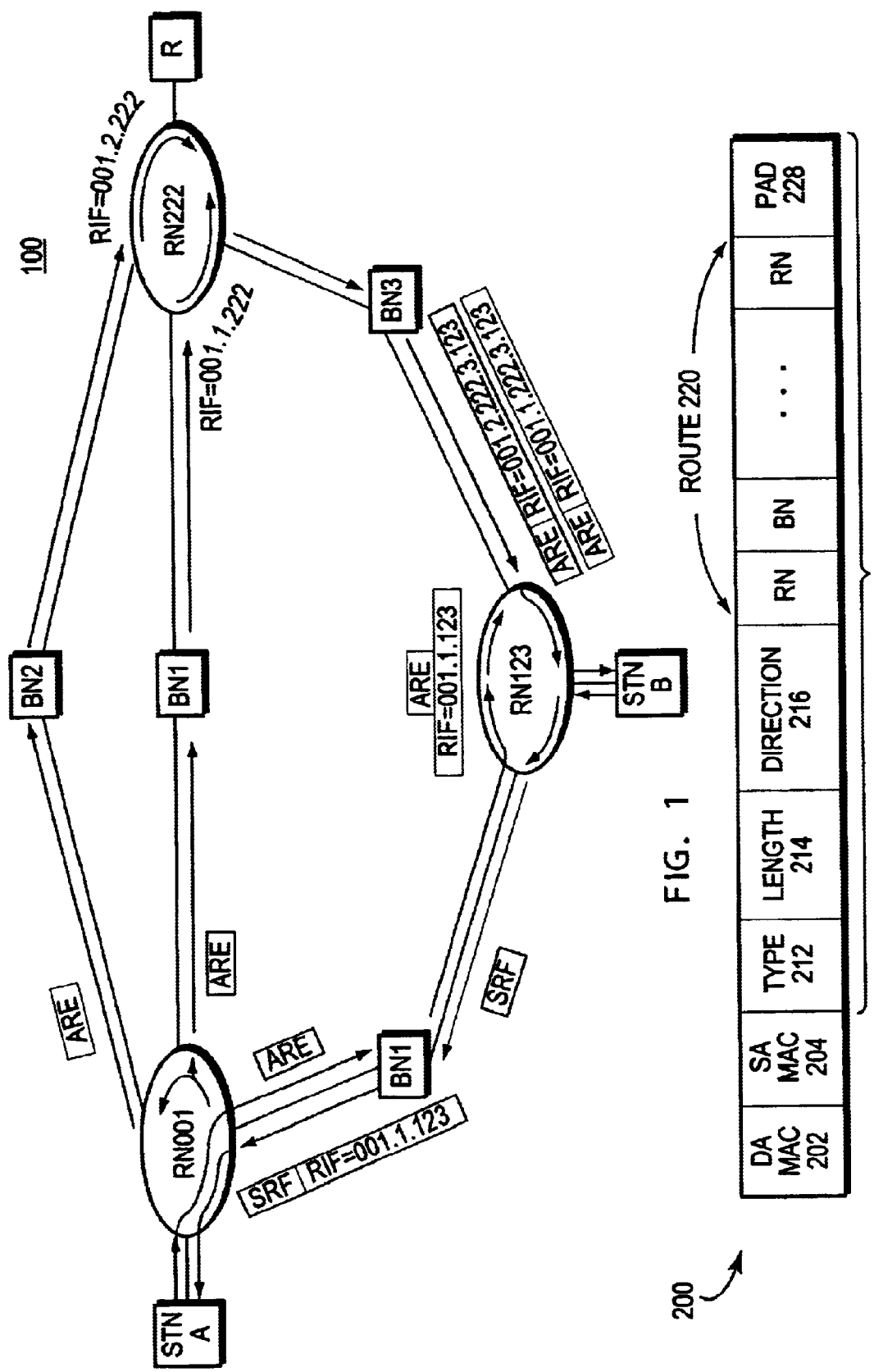

1300

| | B | S | LA | LC | RA | RC | x | x | |
|---|---|---|---|---|---|---|---|---|---|
| 55 | 0 | 0 | 0 | 0 | 0/1 | 1 | | | SW2 |
| 56 | 0 | 0 | 1 | 1 | 0 | 0 | | | SW1 |
| 59 | 1 | 1 | 1 | 1 | 0 | 1 | | | SW1 |
| 1003 | 0 | 1 | 1 | 1 | 1 | 1 | | | SW3 |

1302 brackets rows 55–56 and 59–1003

| | B | S | LA | LC | RA | RC | x | x | |
|---|---|---|---|---|---|---|---|---|---|
| 55 | 0 | 0 | 1 | 1 | 0 | 0 | | | |
| 59 | 1 | 0 | 1 | 1 | 0/1 | 0 | | | SW2/SW1 |

FIG. 14

BACKUP CRF VLAN

REFERENCE TO PROVISIONAL APPLICATION

This patent application claims the benefit under 35 U.S.C. § 119(e) of U.S. Provisional Patent Application No. 60/110,332 titled, Distributed Token Ring Bridge Architecture, by Carson Stuart et al. and filed on Nov. 30, 1998, which application is hereby incorporated by reference as though fully set forth herein.

CROSS-REFERENCE TO RELATED APPLICATIONS

This invention is related to the following copending U.S. Patent Applications:

U.S. patent application Ser. No. 09/266,239 filed on Mar. 10, 1999, titled, Token Ring Bridge Distributed in a Switched Fabric;

U.S. patent application Ser. No. 09/265,668 filed on Mar. 10, 1999, titled, Switched Token Ring over ISL (TR-ISL) Network; and U.S. patent application Ser. No. 09/266,241 filed on Mar. 10, 1999, titled, Distributed Ring Protocol and Database, each of which was filed on even date herewith and assigned to the assignee of the present invention. (put in serial numbers)

BACKGROUND OF THE INVENTION

Communication in a computer internetwork involves the exchange of data between two or more entities interconnected by communication media configured as local area networks (LANs) and wide area networks (WANs). The entities are typically software programs executing on hardware computer platforms, such as end stations and intermediate stations. In particular, communication software executing on the end stations correlate and manage data communication with other end stations. The stations typically communicate by exchanging discrete packets or frames of data according to predefined protocols. A protocol, in this context, consists of a set of rules defining how the stations interact with each other. For example, a LAN employs a data communication protocol (LAN standard), such as Token Ring, Ethernet or Token Bus, that defines the functions performed by the data link and physical layers of a communications architecture (i.e., a protocol stack).

To form a WAN, one or more intermediate devices are often used to interconnect multiple LANs. A bridge is an example of an intermediate station that may be used to provide a "bridging" function between two or more LANs to form a relatively small domain of stations, such as a subnetwork. Subnetworks or subnets provide an organizational overlay to an internetwork that facilitates transmission of data between the end stations. A switch may be utilized to provide a "switching" function for transferring information, such as data frames, between LANs. Typically, the switch is a computer having a plurality of ports that couple the switch to several LANs and to other switches. The switching function includes receiving data frames at an inbound port and transferring them to at least one outbound port of the switch. A router is an intermediate station that interconnects subnets and executes network routing software to allow expansion of communication to end stations of other subnets. Collectively, these hardware and software components comprise a communications internetwork.

FIG. 1 is a schematic block diagram of a conventional Token Ring (TR) internetwork 100 comprising a plurality of TR LANs interconnected by conventional bridges and a router (R). Each token ring is assigned a ring number (RN), such as RN001, RN222 and RN123, and each bridge is assigned a bridge number (BN), such as BN1–3. The RNs assigned to the token rings must be unique within each bridged TR subnetwork that extends to the router. That is, RNs assigned to the token rings within each subnetwork must be different, although BNs assigned to the bridges within each subnetwork may be similar. An exception to this latter rule involves the use of redundant bridges coupling common TR LANs; here, the redundant bridges must have unique BNs in order to distinguish one another.

In the TR internetwork, there may be multiple paths between a source end station and a destination end station. To send a TR frame from a source (such as Station A) to a destination (such as Station B) along a particular path of the internetwork, the source may insert information within a routing information field (RIF) of the frame that specifies the particular path to the destination. FIG. 2 is a schematic diagram of a portion of a conventional TR frame 200 comprising destination address (DA) and source address (SA) medium access control (MAC) fields 202–204 and a RIF header 210. The RIF header 210, in turn, comprises a type (TYPE) field 212, a RIF length indicator (LENGTH) field 214, a direction bit (DIRECTION) field 216 and a ROUTE field 220 that may include a plurality of RN/BN pairs needed to describe the path. Each RN/BN pair comprises 2 bytes, wherein the RN is 12 bits and the BN is 4 bits. The RIF header 210 terminates with a 4-bit padding (PAD) field 228 of zeros.

The source typically acquires the information for insertion into the RIF through the issuance of a special TR frame called an All Routes Explorer (ARE) frame that is broadcasted throughout the TR subnetwork. An ARE frame is typically used to find all paths to a particular destination; an example of a frame used to strictly find the destination is a Spanning Tree Explorer (STE) frame. The STE frame only propagates over network segments that are along a defined spanning tree path to the destination; consequently, the destination only receives one copy of the frame. Execution of a spanning tree algorithm within the bridges results in blocking of certain ports to obviate propagation of frames around loops.

Source Route Bridging (SRB) describes a bridging technique that forwards TR frames based on the RIF information stored in the frame; an example of a frame that has a RIF is called a Specifically Routed Frame (SRF). In contrast, Transparent Bridging (TB) is a bridging technique that forwards TR frames based on their MAC addresses using a forwarding table. Source Route Transparent (SRT) bridging is a merging of the SRB and TB techniques; that is, if there is a RIF in the frame transported over an SRT bridge network, forwarding decisions are based on that RIF, whereas if there is no RIF in the frame, forwarding decisions are made based on the MAC address of the frame using the forwarding table. A TR frame that does not have a RIF is called a Non-Source Route (NSR) frame.

When issuing an ARE frame, the source (Stn A) initially sets the RIF length 214 to "2" (the length of the header 210) signifying that there is no information contained in the route field 220 of the RIF, and loads the type field 212 of the header with information specifying the type of frame, e.g., an ARE frame. Stn A then transmits the ARE frame over token ring RN001 where it is received by each station, including each bridge, connected to the token ring. Upon receiving the frame, each bridge inserts information into the RIF prior to forwarding a copy of the ARE frame onto its connected token ring.

In general, each bridge inserts into the RIF (i) its bridge number and (ii) the ring number of the token ring to which it is forwarding the frame; however, when a bridge receives an ARE frame having a RIF length of "2", the bridge also inserts into the RIF the ring number of the token ring from which the frame is received. For example, a first BN1 inserts into the RIF the following information: the RN of the token ring from which the is frame is received, its BN and the RN of the ring to which it is forwarding the frame <001.1.123>. The contents of the RIF thus describe the path followed by the ARE frame to reach token ring RN 123.

The RIF contents for other copies of the ARE frame broadcasted throughout the TR subnetwork include (i) RIF= <001.1.222> and (ii) RIF=<001.2.222>. These copies of the ARE frame are forwarded over RN222 and the bridges connected to the ring update the RIF of the ARE frames prior to forwarding them to their connected LANs. For example when bridge BN3 forwards the ARE frame to RN123, it updates the RIF header 210, including the length field 214, as a result of inserting its bridge number and connected ring number into the RIF. Thus, the contents of the RIF of an ARE frame propagating over RN123 are <001.1.222.3.123>. Destination (Stn B) receives three ARE frames, one of which has a RIF with contents <001.1.123>, another having RIF contents <001.1.222.3.123> and a third having RIF contents of <001.2.222.3.123>.

Stn B chooses one of the ARE frames (and its RIF contents) as the route over which it returns a response frame; typically, the destination chooses the frame it received first, which may be the frame having the shortest RIF to the source. Stn B thus returns a SRF frame to the source over a path <001.1.123> specified in the RIF. The frame type is indicated as a SRF frame and the direction bit is altered to enable interpretation of the contents of the RIF. In the case of a response frame, the direction bit is inverted to denote that the RIF contents are interpreted in a reverse direction to describe the path to the source.

In general, a properly functioning bridge does not forward a copy of a STE frame or an ARE frame back over a token ring from which it has already traversed. When the ARE frame is "flooded" over RN001, one copy of the frame is received by bridge BN2 and forwarded to RN222, while another copy of the frame is received at a second BN1 and forwarded to RN222. Because each of these bridges reside on the same token ring, the copy of the frame forwarded over RN222 from BN2 is received by BN1 and, similarly, the copy of the frame forwarded over RN222 by BN1 is received by BN2. Yet, those bridges do not forward copies of the frames back onto RN001 because the ARE frames previously traversed that ring. Specifically, BN1 examines the contents of the RIF and, upon detecting that the ARE frame had previously traversed RN001, blocks its port to that token ring. Blocking of the port effectively discards the frame and prevents it from circulating endlessly around a loop, while also preventing end stations from receiving multiple copies of the frame.

A token ring network is typically implemented through the use of TR concentrators (or "hubs") interconnected in a "daisy chain" manner, wherein each concentrator is coupled to end stations via point-to-point wire cables 310. FIG. 3 is a schematic diagram of a conventional TR concentrator network arrangement 300. Collectively, the interconnected concentrators 302–308 form a physical loop/ring configuration that starts at a first TR concentrator 302 and continues through each end station coupled to the concentrator; this configuration extends to each connected TR concentrator up to a last concentrator 308, where it "loops-back" to the first concentrator. Access to the ring is determined in accordance with a token message that propagates among all of the end stations coupled to the ring. A problem with this conventional network arrangement involves the limited bandwidth available to each station over the cables 310; for example, all stations coupled to the physical token ring share 16 megabits per second (Mbps) of bandwidth. In contrast, intermediate stations (switches) in an Ethernet environment are interconnected by 100 Mbps "pipes" that increase the bandwidth available per station.

One way to achieve additional bandwidth in a token ring environment is to apportion the token ring into smaller subrings, each of which is coupled to a bridge. Yet, apportioning a token ring network into subrings requires careful consideration because of the limitations associated with token ring networks. Since each ring number comprises 12 bits, there is only a finite number of ring numbers available per subnet. The total length of the RIF of a TR frame is less than or equal to 30 bytes, thus limiting the RIF to a total of fourteen (14) RN/BN pairs for the typical TR frame 200. Moreover, subrings do not generally scale well for modern networking environments wherein each server coupled to the network requires its own TR concentrator to achieve necessary bandwidth requirements.

Another approach to increasing bandwidth in a token ring environment involves the use of intermediate stations that are compatible with the Dedicated Token Ring (DTR) bridge standard promulgated by the Institute of Electrical and Electronics Engineers (IEEE) in Annex K to the IEEE 802.5 standard (hereinafter "Annex K"), which governs token ring LANs. Annex K defines a 2-tier switching model for a single LAN switch containing a Bridge Relay Function (BRF) to bridge between ports of different ring numbers and a Concentrator Relay Function (CRF) to switch between ports of the same ring number.

FIG. 4 is a schematic diagram of a switch 400 containing a plurality of CRFs (CRF111–333) coupled to a BRF1 to provide bridging and switching operations among physical token ring (TR) media/segments coupled to the switch. Each CRF has a plurality of TR ports that interconnect a plurality of TR segments into one logical token ring having a single ring number. This arrangement is advantageous because it increases the total available bandwidth per logical token ring. That is, for a 4-port switch arrangement, a total of 64 MB of bandwidth is available for, e.g., CRF111.

Functionally, the CRF "switches" TR frames from one TR segment to another, while the BRF "bridges" those frames between different CRFs. That is, rather than or in addition to forwarding frames from one TR segment to another, CRF111 may pass them to its associated BRF1 which may, in turn, forward the frames to CRF222. CRF222 may then forward the frames over one of its TR segments. Thus, the 2-tier switching model allows BRF1 to transfer TR frames between different logical token ring numbers.

FIG. 5 is a schematic block diagram of a conventional bridging arrangement 500 comprising a plurality of switches SW1–2 with a plurality of BRFs (BRF1–3), each of which is coupled to a plurality of CRFs. In general, coupling of a BRF to the CRFs forms a subnetwork; multiple subnetworks may then be interconnected by a router (R) Is located internal (or external) to a switch. However, a CRF may be extended from one physical location to another using a wire 510 that connects one port of the CRF in a switch to another port of the CRF in another switch.

For example, CRF222 may be defined in each switch SW1–2 and its function logically extended between the switches by coupling two ports through the wire 510. Although this enables its ports to occupy a single logical ring number, CRF222 is logically coupled between two different BRFs (BRF1 and BRF2). Each BRF in the switches has an assigned bridge number and constitutes a bridge hop. Notably, the wire 510 used to couple the CRF ports of the switches SW1–2 is generally similar to the cable 310 coupling stations/concentrators of a token ring and, thus, supports 16 Mbps of bandwidth.

In addition to subnets, a computer internetwork may be segregated into a series of network groups. For example, U.S. Pat. No. 5,394,402, to Ross (the "'402 Patent") discloses an arrangement that is capable of associating any port of a switch with any particular segregated network group. According to the '402 Patent, any number of physical ports of a particular switch may be associated with any number of groups within the switch by using a virtual local area network (VLAN) arrangement that virtually associates the port with a particular VLAN designation. Ross discloses a system that associates VLAN designations with at least one internal switch port and further associates those VLAN designations with messages transmitted from any of the ports to which the VLAN designation has been assigned. Thus, those entities having the same VLAN designation function as if they are all part of the same LAN.

The VLAN designation for each internal port is stored in a memory portion of the switch such that every time a message is received by the switch on an internal port the VLAN designation of that port is associated with the message. Association is accomplished by a flow processing element which looks up the VLAN designation in a memory based on the internal port where the message originated. Message exchanges between parts of the network having different VLAN designations are specifically prevented in order to preserve the boundaries of each VLAN segment. In addition to the '402 patent, the Institute of Electrical and Electronics Engineers (IEEE) is preparing a standard for Virtual Bridged Local Area Networks. See IEEE Standard 802.1 q (draft).

U.S. Pat. No. 5,742,604, titled Interswitch Link Mechanism for Connecting High-Performance Network Switches, by Edsall et al. (the "'604 patent") discloses an interswitch link (ISL) encapsulation mechanism for efficiently transporting packets or frames, including VLAN-modified frames, between switches while maintaining the VLAN association of the frames. This patent, which is commonly owned with the present application, discloses an ISL link that connects ISL interface circuitry disposed at two switches. The transmitting ISL circuitry encapsulates the frame being transported within an ISL header and ISL error detection information, while the ISL receiving circuitry strips off this information and recovers the original frame.

U.S. patent application Ser. No. 09/266,239 filed on Mar. 10, 1999, titled Token Ring Bridge Distributed in a Switched Fabric by Carson Stuart et al, discloses a distributed TR bridge having a logical switch fabric that is distributed over a TR switching network of switches interconnected by trunk links, which may comprise ISL links. In Ethernet VLAN applications, it is common to have both ISL and LAN emulation (Lane) paths in a switched network. However, it is not so common to have both of these paths in a TR switching network because ISL and token ring Lane (TrLane) have different switching characteristics. Specifically, an ISL link does not introduce an additional hop in the RIF of a source-routed packet, whereas the TrLane path does. This makes using them in parallel difficult and the present invention is directed to an arrangement that enables TR VLANs to take advantage of both ATMLane and ISL as redundant backup paths.

SUMMARY OF THE INVENTION

The invention comprises a backup CRF VLAN arrangement that provides an alternate, redundant path for traffic between undistributed Concentrator Relay Functions (CRFs) located on different switches interconnected by trunk links, such as Interswitch Link (ISL) trunks, of a distributed token ring (TR) bridge. The backup CRF virtual local area network (VLAN) arrangement defines a backup network path which may be utilized if a primary active path is not a valid path to a backup network. Notably, the backup network comprises a CRF that is distributed among the switches, but that has only one port active at any given time.

According to the invention, the distributed CRF and its associated VLAN are defined as a backup CRF VLAN by, e.g., manually configuring a Distributed Ring Protocol (DRiP) database of each switch in the distributed TR bridge. The DRiP database of each switch reflects the backup CRF VLAN status by asserting a backup bit for a particular entry. Assertion of the backup bit denotes that ports on the CRF VLAN will not be disabled when the DRiP database indicates that another switch has a port configured on the same CRF VLAN.

In addition to providing a backup path for traffic through the ISL-connected network, the novel backup CRF arrangement avoids loop problems associated with active, dual-attached ports by ensuring that only one port of the distributed CRF is active at a given time. A loop problem occurs when a port on more than one switch of the distributed CRF is active and configured at the same time. In response to such a situation, a DRiP core process implements a conflict resolution policy that selects one port (of a switch) to be active for the backup CRF VLAN.

In the illustrative embodiment, the backup network is an ATMLane network primarily because ATM switch networks are typically installed in environments where the TR networks exist and because of their ability to operate at high data rates. However, a backup CRF may also be configured on normal TR ports. The invention thus leverages existing installed networks to provide a backup path to an ISL-connected, distributed bridge environment of TR switches. Moreover, an ATMLane network appears as a CRF from the perspective of the distributed bridge and such a TrLane implementation allows endstations and switches of the ATM network to collectively emulate a logical ring number. Accordingly, the invention further leverages that implementation to enable the ATMLane network to easily function as a backup CRF for the ISL-connected distributed is bridge environment.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 1 is a schematic block diagram of a conventional Token Ring (TR) internetwork comprising a plurality of TR local area networks interconnected by conventional bridges and a router;

FIG. 2 is a schematic diagram of a portion of a conventional TR frame;

FIG. 13 is a schematic diagram of the organization of a first embodiment of a DRiP database according to the invention; and FIG. 14 is a schematic diagram of the organization of a second embodiment of a DRiP database according to the invention.

DETAILED DESCRIPTION OF AN ILLUSTRATIVE EMBODIMENT

Figure 3:
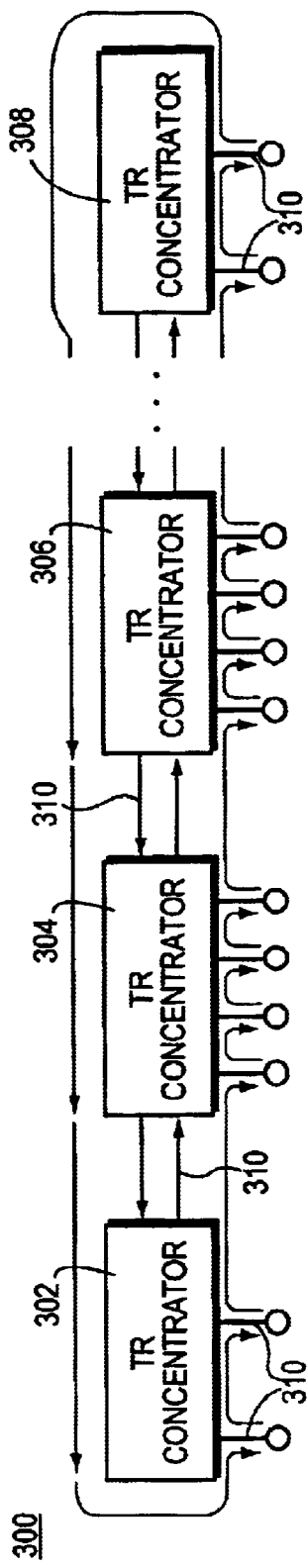
FIG. 3 is a schematic diagram of a conventional TR concentrator network arrangement.
Figure 4:
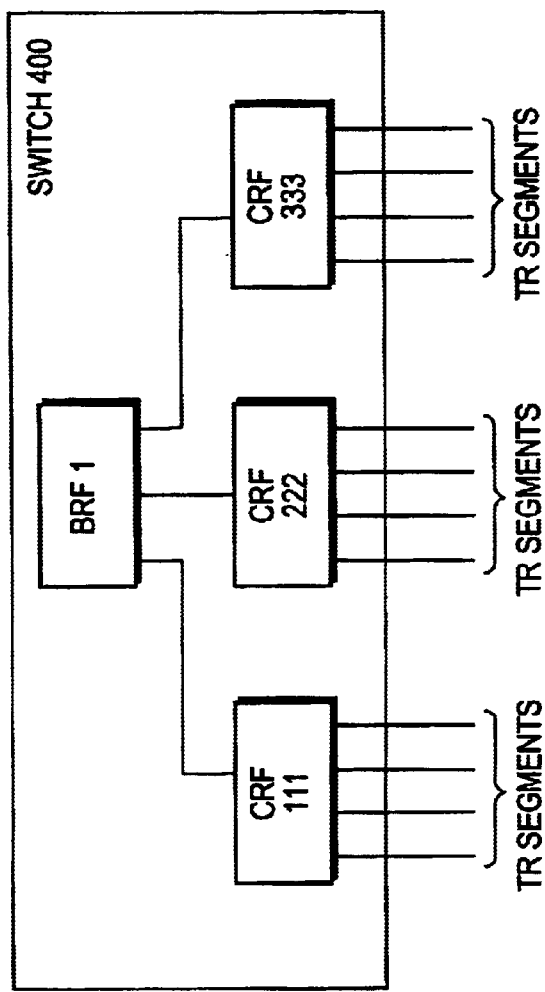
FIG. 4 is a schematic diagram of a switch containing a plurality of Concentrator Relay Functions (CRFs) coupled to a Bridge Relay Function (BRF) to provide bridging and switching operations among physical TR media/segments coupled to a switch.
Figure 5:
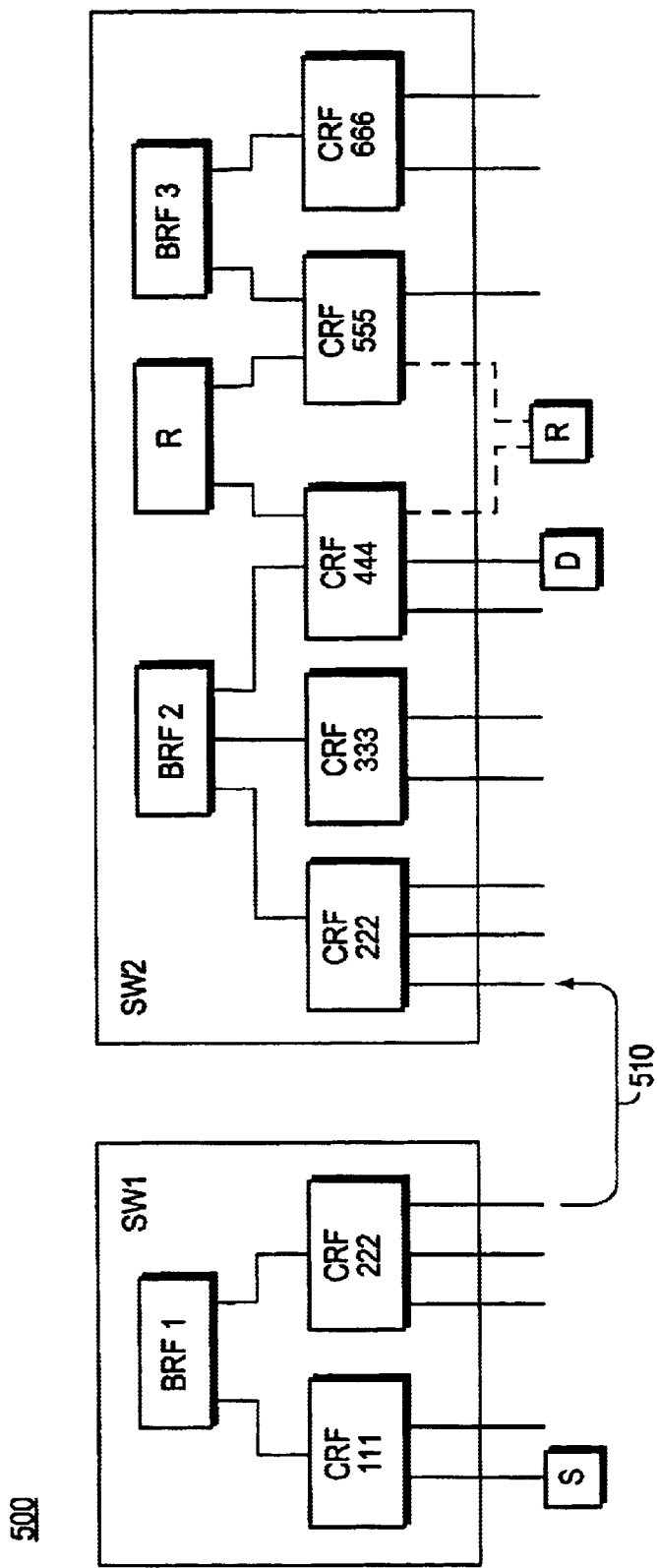
FIG. 5 is a schematic block diagram a conventional bridging arrangement comprising a plurality of switches with a plurality of BRFs, each of which is coupled to a plurality of CRFs.
Figure 6:
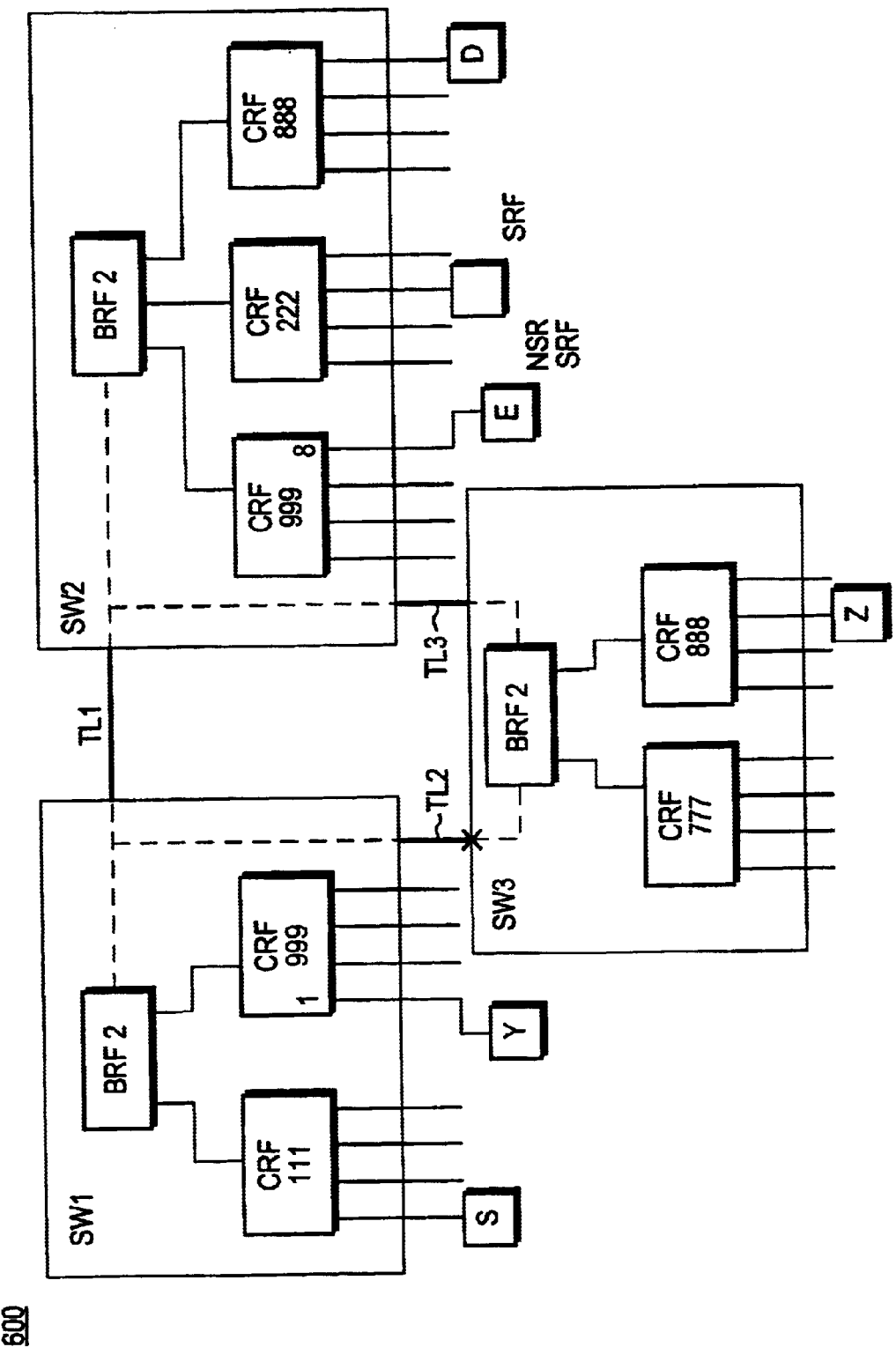
FIG. 6 is a schematic diagram of a TR bridge distributed in a switched fabric according to the invention.

FIG. 6 is a schematic diagram of a token ring (TR) bridge distributed in a switched fabric. The distributed TR bridge 600 includes three TR switches SW1–3, each having a Bridge Relay Function (BRF) logically coupled to a plurality of Concentrator Relay Functions (CRFs); moreover, each CRF has TR ports associated therewith. The physical relationship between ports and bridges in a conventional bridging environment is effectively transformed into a logical relationship between CRFs and BRFs in the distributed TR switching environment. An example of a distributed TR bridge that may be advantageously used with the present invention is described in copending and commonly assigned U.S. patent application Ser. No. (112025-103), titled Token Ring Bridge Distributed in a Switched Fabric by Carson Stuart et al, which application is incorporated by reference as though fully set forth herein.

Specifically, the BRF function (denoted BRF2) is logically distributed across switches SW1–3 so as to create a single BRF distributed switchfabric that spans a plurality of (e.g., three) physically distinct locations. Instead of having a non-disperse BRF in each switch (as described in Annex K), the function of a particular BRF is extended among multiple switches in a distributed manner. The distributed BRF environment may be further extended to include a distributed CRF arrangement. Although there may be multiple physical rings coupled to a CRF, the CRF defines a single ring number (RN) and the multiple physical rings are logically associated as a single ring. Thus, a CRF (e.g., as CRF999) contained within a switch (e.g., SW1) may be distributed among at least one other switch (e.g., SW2). Physical token rings are coupled to each CRF such that only end stations (users) need be associated with each ring.

Figure 7:
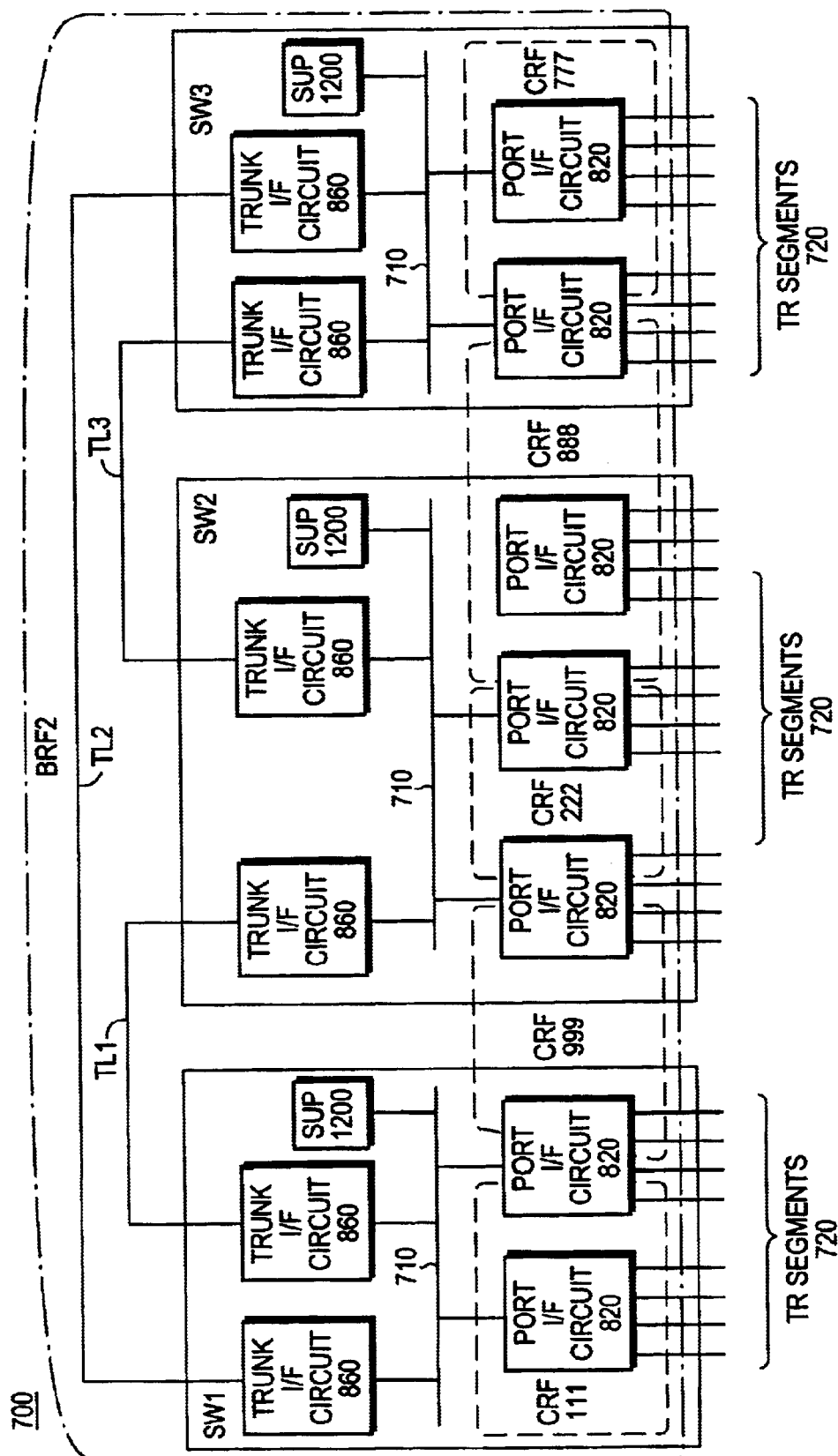
FIG. 7 is a schematic block diagram of an illustrative embodiment of a network switch platform having a plurality of switches configured as a distributed TR bridge in accordance with the present invention.

FIG. 7 is a schematic block diagram of an illustrative embodiment of a network switch platform configured as a distributed TR bridge 700. The distributed bridge platform comprises three switches SW1–3, each including port interface (I/F) circuitry 820, trunk interface (I/F) circuitry 860 and a supervisor (SUP) module 1200 interconnected by a bus 710. The port interface circuitry 820 includes a plurality of TR ports that interconnect a plurality of TR media segments 720, whereas the trunk interface circuitry 860 are interconnected by trunk links TL1–3. The distributed bridge further comprises BRF/CRF constructs "overlayed" onto the platform circuitry to create a logically-defined relationship among the ports and CRFs, and among the switches and distributed BRF.

The port interface circuits are organized and defined as CRF111, 999, 222, 888 and 777, whereas the interconnected port and trunk interface circuits are organized and defined as a BRF that is distributed among the switches SW1–3 to create a single logical switch fabric. The trunk links may comprise any type of physical link configured as a local area network (LAN) or wide area network (WAN) link. An example of a trunk link that may be used with the present invention is described in commonly-assigned U.S. patent application Ser. No. (112025-105), titled Switched Token Ring over ISL (TR-ISL) Network, by Carson Stuart et al, which application is incorporated by reference as though fully set forth herein.

Source route bridging (SRB) and/or source route transparent bridging (SRT) operations are supported between physical token rings of the distributed bridge environment. Any BRF or CRF, including the physical token rings coupled to the CRF, may be located in any switch coupled to the distributed bridge. When configuring the distributed bridge, the BRF bridge number (BN) within each switch is initially defined and the CRF RNs associated with the BRF are defined. From a configuration point of view, ports are associated with a CRF and CRFs are associated with a BRF. For example, rings/ports coupled to CRF222 may be physically coupled to SW2, yet may be also logically associated with SW1,3. This configuration information is provided to all of the BRFs associated with the distributed TR bridge.

Distributing a BRF function among different switches requires "knowledge" on behalf of the BRF of those CRFs that are associated with the bridging function, yet that reside on the different switches. For example, BRF2 on SW1 must be aware that it is logically associated with CRF222 on SW2 and BRF2 on SW2 must be aware that it is logically associated with CR111 on SW1. Typically, a conventional bridge acquires such knowledge through configuration management capabilities that provide configuration information such as the bridge number of the bridge, the bridging type of the bridge, the ring numbers associated with the bridge and the medium access control (MAC) address of the bridge. Likewise, configuration information such as the BRF number, bridging type of the BRF, MAC address of the BRF and CRF numbers associated with the BRF need to be provided to the components of the distributed TR bridge. Such configuration information is contained in data structures such as, e.g., modified forwarding tables.

Figure 8:
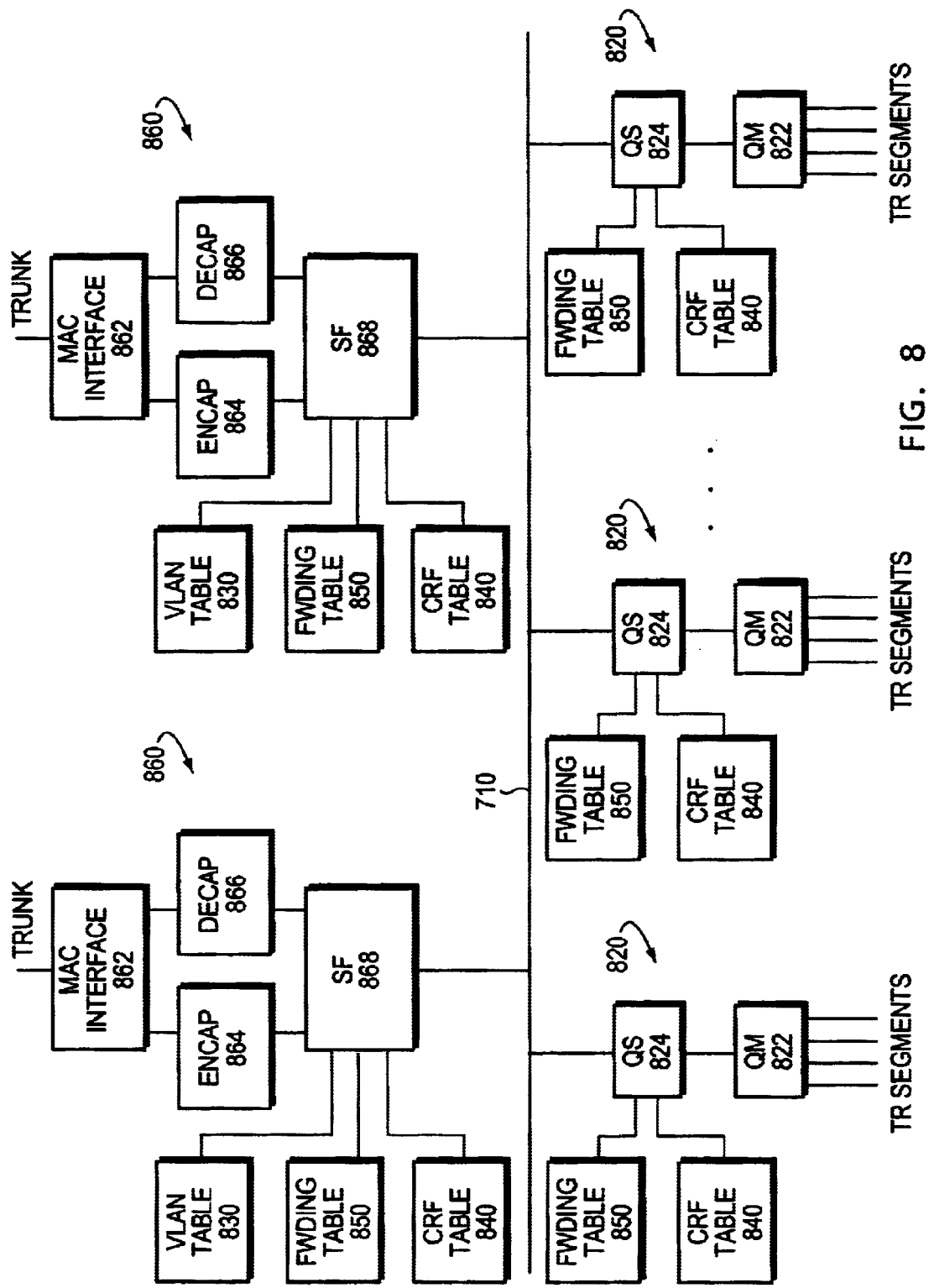
FIG. 8 is a schematic block diagram of trunk and port interface circuitry contained within each switch of the distributed TR bridge.

FIG. 8 is a schematic block diagram of the port interface circuitry 820 and trunk interface circuitry 860 of each switch. In the illustrative embodiment, the port interface circuitry 820 of a CRF is coupled to a modified forwarding table 850 and a CRF table 840, whereas the trunk interface circuitry 860 of a BRF is coupled to a virtual local area network (VLAN) table 830, in addition to the modified forwarding table 850 and CRF table 840. The trunk interface circuitry 860 comprises a MAC interface circuit 862 coupled to a switch fabric interface (SF) device 868 by way of trunk encapsulation (ENCAP) and decapsulation (DECAP) circuits 864 and 866. These latter circuits encapsulate/decapsulate frames with information that is forwarded over/received from the trunks. The MAC interface 862 provides an IEEE 802.x service layer for moving frames to and from the trunking links, whereas the SF device 868 is configured to perform data buffering and frame manipulation, as well as filtering, look-up and forwarding decision operations using the tables.

The port interface circuitry 820 comprises a Quad medium access control (QM) device 822 and a Quad Switch fabric interface (QS) device 824, the latter of which is coupled to the modified forwarding table 850 and the CRF table 840. Each QS device 824 preferably services four (4) ports via a QM device 822. The QM 822 comprises MAC circuitry that preferably provides an IEEE 802.5 service layer for moving the frames to and from the TR segments; more specifically, the MAC capability allows attachment of the switch to a network entity, such as a processor or similar circuit that interfaces with LAN medium connections. The QS 824 is preferably a multi-port switching device configured to perform data buffering and frame manipulation, as well as filtering, look-up and forwarding decision operations using the tables. Accordingly, the forwarding decision circuitry embodied in the QS and SF devices is actually distributed and, thus, collectively these circuits provide the "intelligence" for switching and bridging frames throughout the TR bridge in a distributed switching processing arrangement.

Each CRF and BRF of the distributed TR bridge is assigned an individual VLAN in a "2-tier" arrangement. That is, each CRF is assigned a VLAN identification (ID) and the logically-coupled BRF is assigned its own overlapping/encompassing VLAN ID. The VLAN table 830 is used by the trunk interface circuitry to acquire information (such as CRF VLAN IDs) pertaining to TR frames flowing through the circuitry. The port and trunk interface circuitry process an incoming frame by, inter alia, performing look-up operations into the CRF and modified forwarding tables to enable rendering of a forwarding/switching decision over the distributed bridge. Examples of VLAN, CRF and modified forwarding tables that may be advantageously used with the present invention are described in the Token Ring Bridge Distributed in a Switched Fabric patent application (112025-103) incorporated herein. Although the modified forwarding table 850 and CRF table 840 are shown as shared among the four QS/QM ports, these tables may be distributed in a manner such that there is only one modified forwarding table and one CRF table (along with one VLAN table) per switch.

Figure 9:
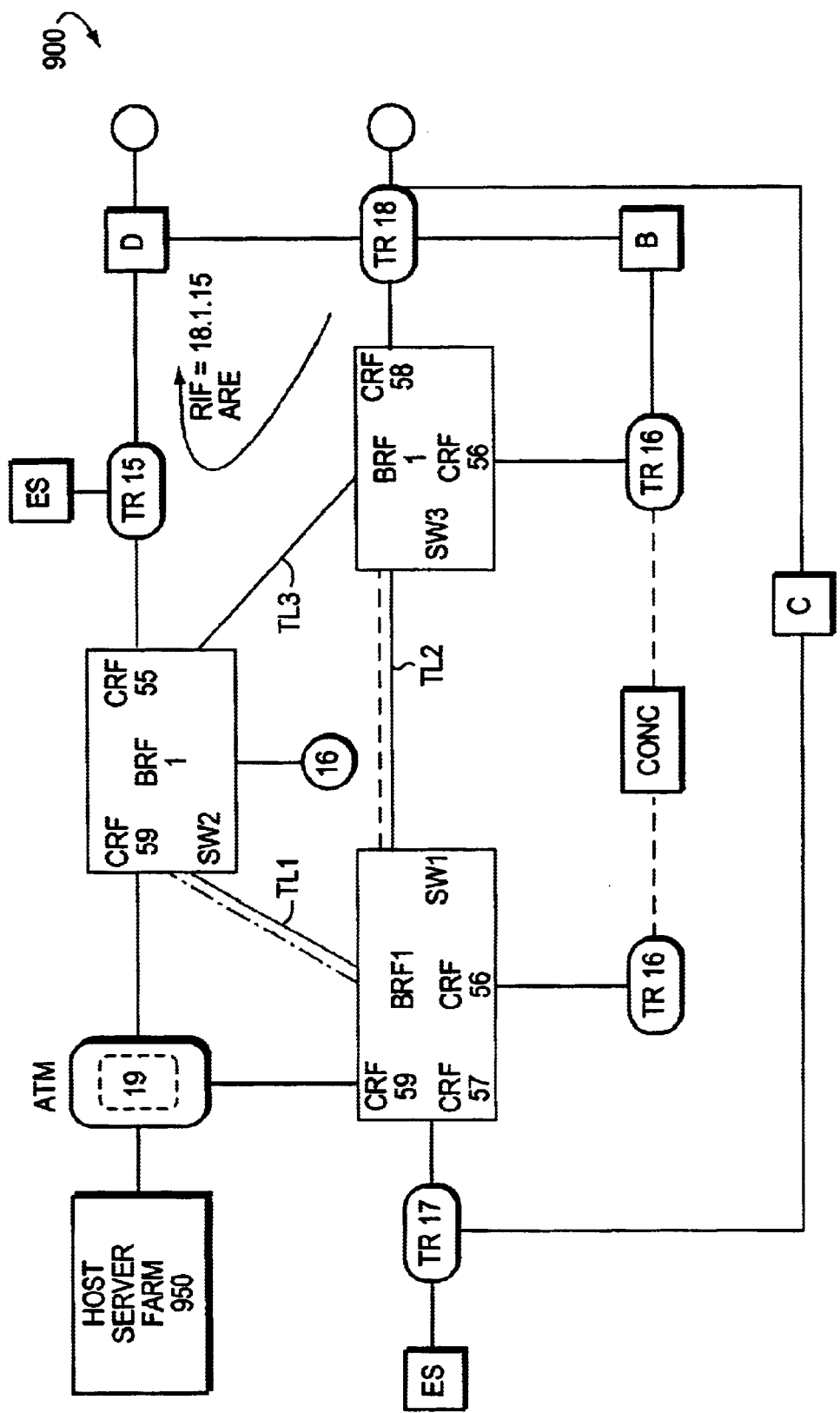
FIG. 9 is a schematic diagram of an embodiment of the distributed TR bridge that may be advantageously used with the present invention.

FIG. 9 is a schematic diagram of an embodiment of the distributed TR bridge 900 that may be advantageously used with the present invention. The distributed TR bridge comprises three physical switches (SW1–SW3) interconnected by trunking links, such as is (TR) ISL links TL1–3, to form a switched network cloud. A BRF function (BRF1) is distributed among the switches; in addition, a CRF function is distributed in the bridge as denoted by TR16 being coupled to SW1 and SW3, and further being interconnected by a concentrator (Conc) function. The distributed functions interact with the ISL-connected switches to provide an ISL switching fabric that may be advantageously used with the present invention.

In the case of a token ring LAN emulation (TrLane) proxy client, an ATMLane network may function as a CRF from the perspective of the distributed switch of the ISL-connected cloud. For example, if SW1 is the active connection into an ATMLane network (ATM19), then CRF59 within BRF1 (SW1) functions as a "proxy client" for the ISL-connected cloud to a host-server "farm" 950 when the client attempts to connect to the server. Here, CRF59 uses its DRiP database to determine whether a TR, e.g., TR1 8, is configured and/or active; if that ring is active, the proxy client can transmit the message to the server.

The DRiP database is maintained in each switch of the ISL switching fabric, and comprises ring numbers and active ports within the switched network cloud bounded by the span of the ISL-connected mesh network of switches. The DRiP protocol distributes the information contained in the DRiP database within the switched network cloud by exchanging information among the switches relating to the active status of VLANs associated with their CRFs. An example of a DRiP database and protocol that may be advantageously used with the present invention is described in copending and commonly assigned U.S. patent application Ser. No. (112025-106), titled Distributed Ring Protocol and Database by David Carroll et al, which application is incorporated by reference as though fully set forth herein.

The DRiP protocol thus defines a communication message exchange between switches of a distributed TR bridge, wherein the messages are exchanged both periodically and when there is a change in status of any VLAN ID. These periodic and specifically-issued message exchanges ensure coherency of the DRiP databases maintained by the switches. Broadly stated, each switch distributes the status of VLANs associated with its CRFs in a defined manner according to the protocol. For example, SW2 distributes advertisements/updates pertaining to the VLAN IDs associated with CRF59 and 55, but not advertisement s pertaining to VLAN IDs associated with CRF56 and 58 (which are contained in SW3).

VLANs are described within DRiP advertisements in two categories. The first category involves CRF ports that have no activity and have no end stations or bridges coupled to their physical rings. The DRiP protocol advertises these ports as configured. The second category involves CRF ports that have at least one active end station coupled and inserted into its physical ring; the DRiP protocol advertises these ports as configured and active. A CRF port that observes activity from an attached endstation or bridge over its token ring provides a configured and active port status to the DRiP database. If the port does not observe activity, it will have a configured (as opposed to active) status. A configured state is significant in the event a primary path goes down and an alternate path is necessary for communication within the distributed bridge. These advertisements are also useful with respect to detecting invalid configurations pertaining to VLAN IDs associated with CRFs and, as noted, for ARE reduction.

Figure 10:
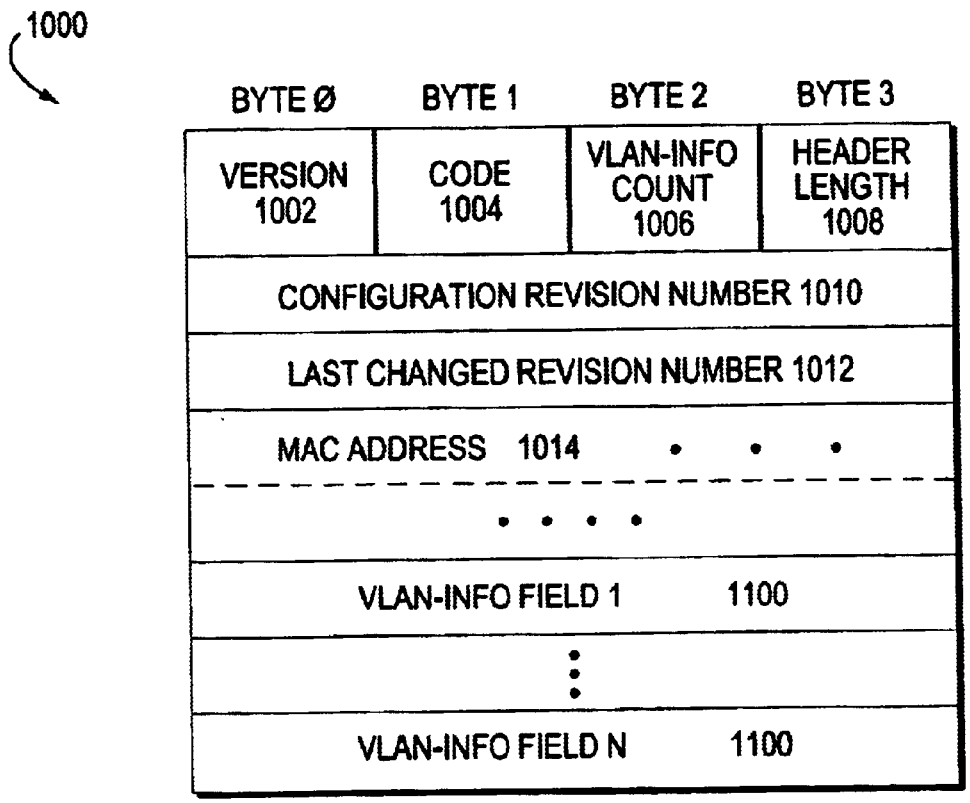
FIG. 10 is a schematic block diagram illustrating the format of a DRiP advertisement message.

FIG. 10 is a schematic block diagram illustrating the format of a DRiP advertisement message 1000. A version field 1002 contains a version number of the message and the contents of a code field 1004 specify the type of message (e.g., periodically-exchanged or specifically-issued advertisement message). A VLAN-info count field 1006 contains the number of VLANs advertised in the message. Advertisements occur on a per-switch basis so that, in the case of SW1, the advertisement message advertises VLANs associated with, e.g., CRF57 and CRF56. A header length field 1008 contains the number of bytes of header for the particular type of advertisement. The header is typically 20 bytes in length and extends from the version field 1002 to the first byte of a first VLAN-Info field 1100 (including the Reserved field).

A configuration revision number field 1010 contains a sequence number used to determine whether a particular advertisement has been seen by the switches of the distributed TR bridge. A last changed revision number field 1012 contains the last revision number of a change associated with an originating MAC address. For example, if a particular switch missed a change revision advertisement message (as opposed to a periodic advertisement), the last changed revision number informs that switch it needs to update its database. The next field is a MAC address field 1014 which contains the MAC address of the switch sending the DRiP advertisement 1000. The field 1014 is used to identify the originator of the DRiP Advertisement message; accordingly, the contents of this field need not be an actual MAC address, but may comprise any identifer that uniquely identifies the switch within the network.

The remaining fields of the DRiP advertisement message are VLAN-Info fields 1100 (1–N). There is a VLAN-Info field for each active or configured CRF on a switch. The advertisement only contains local information and, as such, no switch may initiate an advertisement for any CRF that is not "local" to it (within the switch). If a CRF VLAN ID is not contained in an advertisement, then the CRF is considered no longer active and is deleted from the DRiP database. An advertisement (periodic and changed) contains all CRF information for the switch generating the advertisement.

Figure 11:
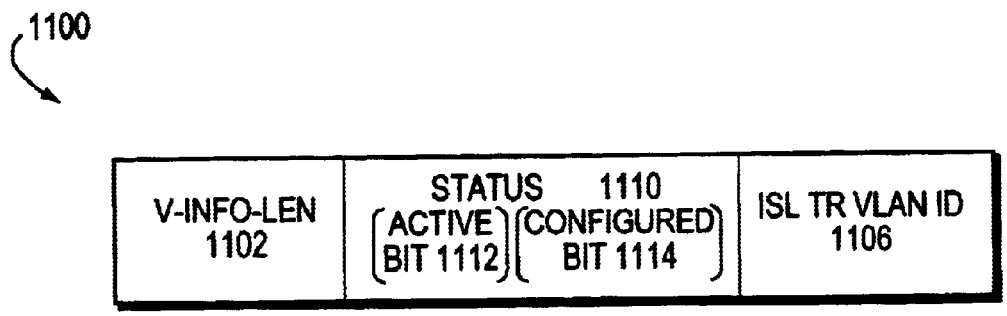
FIG. 11 is a schematic diagram of the format of a virtual local area network information field contained in the DRiP advertisement message of FIG. 10.

FIG. 11 is a schematic diagram of the VLAN-Info field 1100 containing a V-Info-length subfield 1102 whose contents specify the length (in bytes) of the VLAN-Info field (including this subfield). The contents of a status subfield 1110 specify the status of the CRF as having an active port or as having no active ports, but configured ports. There are two notable bits within the status subfield 1110: an active bit 1112 and a configured bit 1114. Assertion of the configured bit 1114 indicates that at least one port has been assigned to a particular VLAN ID on the switch, while assertion of the active bit 1112 indicates that at least one port in the CRF is inserted in its physical ring segment. The last subfield in the VLAN-Info field 1100 is an ISL TR VLAN ID subfield 1106 that contains a VLAN ID (out of a maximum 1024 VLAN IDs) of the CRF.

Figure 12:
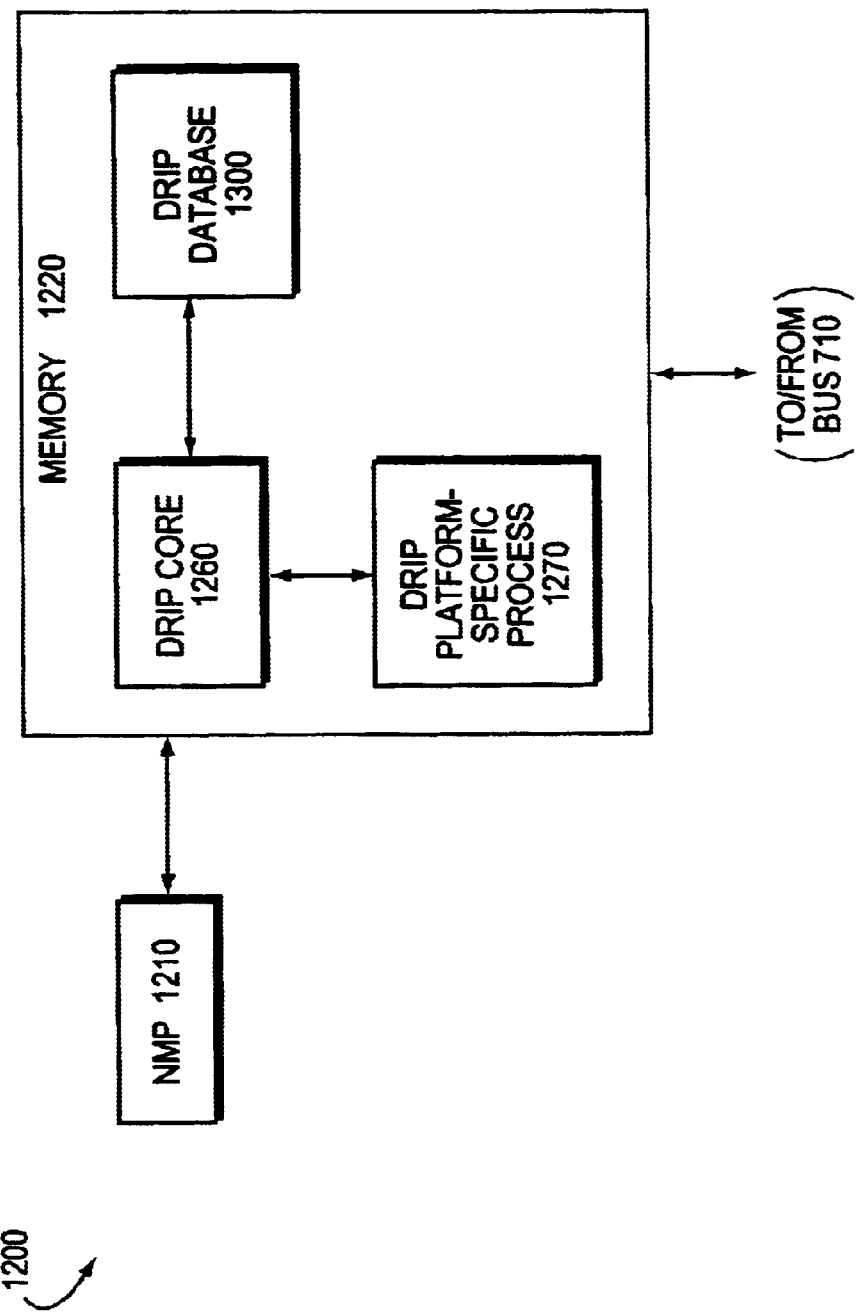
FIG. 12 is a schematic diagram of a network management processor module that includes DRiP software elements in accordance with the present invention.

As noted, the advertisement message 1000 is used for both periodic and changed message exchanges among the ISL-connected switches of the distributed bridge 900. The DRiP database is maintained by, and the protocol is administered by, DRiP software implemented on each switch of the distributed bridge and stored on a memory 1220 of a supervisor module such as, e.g., SUP module 1200 (FIG. 7). FIG. 12 is a schematic diagram of the SUP module 1200 including a DRiP database 1300 and DRiP software executing on a processing element configured as, e.g., a network management processor (NMP) 1210. The DRiP software comprises two main elements: a DRiP core element 1260 and a DRiP platform-specific element 1270, each of which is an application (process) program executing on the NMP 1210. Advertisement messages directed to the core element are "queued" by the platform-specific process prior to being relayed to the DRiP core element for processing.

The DRIP core process 1260 is responsible for constructing and maintaining the DRiP database 1300, and determining whether there are any conflicts with VLAN IDs distributed throughout the bridge 900. The DRiP core 1260 generates and receives advertisements, the latter from other switches in the distributed bridge and from its own switch when local configuration changes occur within the switch. Upon detecting these changes, the core process instructs the platform-specific process 1270 to notify the appropriate functions within the platform about the changes. The DRiP core may be ported to multiple different platforms, whereas the platform-specific process is configured to run on the specific platform to address issues such as advertisement message handling and specific-function notification within the platform. For example, if there is a need for system level service, such as transmitting an advertisement 1000, the core process 1260 makes a function call to the service function defined in the platform-specific process 1270, which then calls the associated routines in an operating system of the platform.

FIG. 13 is a schematic diagram of the organization of a first embodiment of the DRiP database 1300 having a plurality entries, each of which contains a plurality of bits. Each entry of the DRiP database 1300 is assigned on a per VLAN basis. The DRiP database preferably functions as a state machine wherein certain actions are specified based on the states of these bits. Specifically, the bits include a backup (B) bit and a shared (S) bit. The B bit relates to a backup CRF function, whereas the S bit informs the DRiP software that a particular VLAN may be shared and/or distributed among multiple switches. In the illustrative embodiment described herein, only CRF1003 may be distributed. The bits of the database further include a local active (LA) bit, a local configured (LC) bit, a remote active (RA) bit and a remote configured (RC) bit. Also, there are two reserve bits denoted X.

Each entry of the database 1300 further includes a unique identifer (ID) contained in field 1302. The unique ID is included in the DRiP advertisement message 1000 and identifies the owner of each VLAN ID entry of the DRiP database. In the illustrative embodiment, the unique ID is preferably the MAC address of a particular switch within the distributed bridge. For example, CRF/VLAN 55 is owned by SW2 because that switch has ports associated with that VLAN ID. The database of FIG. 13 is preferably located in SW1 and the owner of VLAN55 is remote to that database. Therefore, the MAC address stored in the unique ID field 1302 of entry 55 is the MAC address of SW2. On the other hand, CRF/VLAN ID 56 is owned by SW1, so the MAC address associated with entry 56 is the MAC address of SW1. Since CRF/VLAN ID 1003 is shared between multiple switches, the last switch that advertises ports on VLAN ID 1003 has its MAC address associated with that entry in the DRiP database. Assuming that SW3 sends the latest advertisement referencing VLAN ID 1003, then the MAC address of SW3 is loaded into entry 1003 of the database.

Referring again to FIG. 9, assume an endstation (ES) coupled to TR17 attempts to communicate with an endstation (ES) coupled to TR15 through SW1 and SW2 over trunk link TL1 coupling the switches. The CRFs associated with the TR ports coupled to TR15 and TR17 are located on separate switches and are not distributed; that is, the TR port attached to TR17 is associated with CRF57 and the TR port attached to TR15 is associated with CRF55. Yet, CRF57 and CRF55 are logically coupled to BRF1, which is distributed among the switches. Assume also that the trunk link TL2 between SW1 and SW3 is not present in the distributed bridge network (as denoted by a dashed line), and that a failure occurs with the trunk link TL1 between SW1 and SW2 (as denoted by a dashed-dotted line). Therefore, communication between the TR ports is hindered and it is desirable to restore such communication in a fast and efficient manner with minimal session loss.

As described further herein, an arrangement is provided wherein a network may be defined as a backup network between SW1 and SW2. In the illustrative embodiment, the backup network is the ATM 19 network primarily because ATM switch networks are typically installed in environments where the TR networks exist. A typical installation includes the host server farm 950 coupled to an ATM switched network with a trunk connection across the ATM switched cloud to a switch of the distributed bridge. The invention thus leverages existing installed networks to provide a backup path to an ISL-connected, distributed bridge environment of TR switches. However, it is understood that another type of TR network may also be advantageously used as a backup network.

In accordance with the present invention, the backup network comprises a special type of CRF that is distributed among the switches (e.g., between SW1 and SW2), but that has only one active port at any given time to the backup network for the entire ISL distributed bridge network. Essentially, this backup CRF arrangement provides a backup path for traffic between undistributed CRFs located on separate switches of the ISL-connected network, while avoiding loop problems associated with active, dual-attached ports. A loop problem arises when a port on more than one switch of the distributed CRF is active and configured at the same time.

The ATM 19 switched network functions as a backup CRF by providing an alternate route through the ISL mesh network of switches. As noted, an ATMLane network appears as a CRF from the perspective of the distributed bridge 900 and such a TrLane implementation allows end-stations and switches of the ATM network to collectively emulate a logical ring number. Accordingly, the invention further leverages that implementation to enable ATM19 to easily function as a backup CRF for the ISL-connected distributed bridge environment. It will be apparent to those skilled in the art that a different media could be used as a backup CRF path if it is capable of being configured as a is CRF with a logical ring number.

Specifically, the invention involves defining a particular CRF and its associated VLAN as a backup CRF VLAN. The particular CRF may be defined as a backup CRF by either manually configuring the DRIP database of each switch in the distributed bridge or by employing a conventional protocol, such as the VLAN trunking protocol (VTP), configured to set up and manage VLANs in a network. The DRIP database of each switch reflects the backup CRF VLAN status by asserting the backup (B) bit for a particular entry. Assertion of the B bit denotes that ports on the CRF VLAN will not be disabled when the DRiP database indicates that another switch has a port configured on the same CRF VLAN. For example, the CRF59 is defined as a backup CRF VLAN by asserting the B bit of entry 59 in the DRIP database 1300 of SW1 (FIG. 13).

FIG. 14 is a schematic diagram of the organization of a second embodiment of the DRIP database 1400 for SW2 illustratively showing two entries (CRF55 and CRF59). Initially, the B bit is only asserted for entry 59 on database 1400; therefore, each entry 59 on the databases of SW1 (FIG. 13) and SW2 (FIG. 14) has its B bit asserted. Moreover at least one port on each of the CRF VLANs 59 for SW1 and SW2 is configured, resulting in the configured bit (LC) being asserted on the database of each switch. Assertion of the LC bit on each switch for the same VLAN generally creates a conflict because each switch believes that it "owns" the particular VLAN. Such a conflict is manifested as a result of DRiP advertisement exchanges between the two switches, which causes each switch to realize that other is configured for that VLAN. Yet, the backup CRF VLAN invention allows one of these ports to be active and configured, with the DRiP core process selecting that port. It should be noted that if the B bit is not asserted for each entry, the core process disables the ports associated with the VLAN.

According to the invention, the DRiP core processes on SW1 and SW2 resolve the conflict by selecting a port to be active and configured for CRF VLAN59. The conflict may be resolved in accordance with a variety of conflict resolution parameters; however, in the illustrative embodiment, conflict resolution is based on the MAC address of each switch and, in particular, the conflict is resolved in favor of the lesser address value. Of course, the determination of which MAC address wins a conflict may equally be resolved in favor of the MAC address having the greater value as opposed to the lesser. More specifically, the DRiP core on SW1 receives an advertisement message indicating that VLAN59 on SW2 is configured and active. From the point of view of SW1, the entry for VLAN59 specifies a locally-configured (LC) and locally-active (LA) port on that VLAN. After executing the conflict resolution policy, the DRiP core on SW1 determines that SW1 should have the active and configured port on VLAN59 because the MAC address of SW1 is less than that of SW2. As a result, the state of the B bit and the unique ID for entry 59 remain unchanged on database 1300.

Meanwhile, SW2 also receives the advertisement exchange between SW1 and SW2 indicating that SW1 has a configured and active port on VLAN59. The DRiP core process on SW2 executes the conflict resolution policy to determine that the MAC address of SW1 is less than that of SW2. In response to this determination, the DRiP core informs the platform-specific process that the ports associated with CRF/VLAN 59 on SW2 are not allowed and should be disabled. As a result, the LC bit and RC bit of entry 59 in the database of SW2 are asserted, and the unique ID associated with that entry is changed to the MAC address of SW1 because SW2 "lost" the conflict (note that this transition is indicated as "SW2/SW1" for entry 59 of database 1400). It should be noted that the TR ports of entry 59 on SW2 cannot "insert" because they are disabled.

However after the ports on SW1 are "brought up", they insert into the switch and another advertisement exchange takes place over the bridged network. The exchange advertises the updated status of the database of SW1, which reflects that (i) VLAN59 is a backup CRF (i.e., B bit is asserted), (ii) its ports are locally-active and locally-configured (i.e., the LA and LC bits are asserted) and (iii) there is another switch in the bridged network that has VLAN59 configured, although SW1 still "owns" that VLAN entry (i.e., the S bits is asserted). In response to the advertisement exchange, the DRIP software asserts the remote active (RA) bit for VLAN entry 59 on the SW2 database (note that this transition is indicated as "0/1" for bit RA). Accordingly, there is only one active connection to is the backup ATM network from the ISL-connected distributed bridge and there are no loops; significantly, there is a means to communicate from TR17 to TR15 in the event of an ISL link failure.

Although periodic DRiP advertisement messages are exchanged among the switches of the distributed bridge, neither these messages nor the DRIP databases indicate the status (up/down or active/inactive) of the ISL links connecting the switches of the bridged network. As noted, there is no ISL connection between SW1 and SW3, and the ISL connection link between SW1 and SW2 has failed. Therefore, end stations coupled to TR15 ports have no means for reaching the host server farm 950 on ATM19 because the ports on VLAN59 for SW2 have been disabled. After a predetermined number of periodic advertisement messages (e.g., four messages) from SW1 have not been "seen" or responded to (due to the ISL link being down) by SW2, SW2 "flushes" its database with respect to SW1. Specifically, the DRiP core process on SW2 scans its database for entries owned by SW1 and "times-out" the active and configured bits associated with those entries.

When the core process encounters entry 59, it determines that the B bit is asserted and that the entry is owned by SW1, signifying that VLAN59 is a backup to the ISL link TL1 coupling SW1 and SW2. The locally-configured (LC) bit is also asserted for entry 59 further signifying the backup status of that CRF/VLAN. Because SW2 is flushing its database with respect to entries owned by SW1, the remote active and configured (RA, RC) bits for entry 59 are deasserted and the MAC address associated with that entry is changed from SW1 to SW2. Since the backup (B) bit is asserted, the core process of SW2 instructs the platform-specific process to reactivate the ports associated with VLAN59 to enable a backup path to SW1. When a port is actually inserted on VLAN59, the locally active (LA) bit is asserted for that entry in the database of SW2. In response to the state changes in its database, the core process of SW2 sends advertisement messages to SW3 notifying it of these updates.

Accordingly, the distributed bridge of FIG. 9 has effectively been severed into two "halves" since the trunk (ISL) link between SW1 and SW3 is not present. When the trunk link TL1 between SW1 and SW2 fails, the ATM19 switched network becomes the backup CRF to the severed bridged network. The resulting network configuration is somewhat peculiar because the RIFs needed to communicate between the two halves of the network are different. That is, to communicate between endstations on TR16 and TR15, the RIF (before the trunk link TL1 failed) was <16.1.15>; once the trunk link is down, the RIF becomes <16.1.19.1.15>. Although this latter route is expanded from the former, it still is a proper functioning route. The ATM 19 switched network (TrLane) may be substituted for an actual TR network and still provide the same backup function.

Assume now that the trunk (ISL) link TL2 between SW1 and SW3 is up and functional. If the ISL link TL1 between SW1 and SW2 remains down, each switch still receives advertisement messages from the other. For instance, SW2 receives advertisement messages issued by SW1 from SW3 and SW1 receives advertisement messages issued by SW2 from SW3. In order for the backup ATM19 network to be invoked as a novel backup CRF VLAN, not only must the ISL connection TL1 between SW1 and SW2 go down, but also the ISL connection TL2 between SW1 and SW3 must fail. In summary, the ISL mesh network must effectively be apportioned in half for the ATM/TR backup network to become a backup CRF VLAN in accordance with the present invention.

While there has been shown and described an illustrative embodiment of a backup CRF VLAN arrangement that provides an alternate, redundant path for traffic between undistributed CRFs located on separate switches interconnected by ISL trunks, it is to be understood that various other adaptations and modifications may be made within the spirit and scope of the invention. For example, in an alternate embodiment of the invention, the backup CRF VLAN arrangement provides a means for having three or more connections from different switches or the same switch to the backup ATM19 network. This embodiment is particularly notable in the case of a previously-installed ATM switched network.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for providing a redundant path for traffic between undistributed Concentrator Relay Functions (CRFs) located on different switches interconnected by trunk links of a distributed token ring (TR) bridge, the method comprising the steps of:

providing a backup network having a CRF with associated ports, the CRF distributed among the switches and having only one port active at a time;

connecting the backup network between the switches of the distributed TR bridge, the backup network having a primary active path and a backup network path to the distributed TR bridge; and utilizing the backup network path if the primary active path is not a valid path to the backup network.

2. The method of claim 1 wherein the step of utilizing further comprises the step of utilizing the backup network path in response to activation of a TR connection when a trunk link within the distributed TR bridge fails.

3. The method of claim 1 further comprising the steps of:

associating a virtual local area network (VLAN) with the distributed CRF; and configuring a database of each switch in the distributed TR bridge to define the distributed CRF and associated VLAN as a backup CRF VLAN.

4. The method of claim 3 wherein the step of configuring further comprises the step of manually configuring the DRiP database of each switch in the distributed bridge.

5. The method of claim 3 wherein the step of configuring further comprises the step of employing a conventional protocol configured to set up and manage VLANs in a network.

6. The method of claim 3 wherein the database is a distributed ring protocol (DRiP) database having a plurality of entries and wherein the step of configuring comprises the step of asserting a backup bit for an entry of the database to reflect a backup CRF VLAN status of the backup CRF VLAN.

7. The method of claim 6 wherein the step of asserting comprises the step of denoting that ports on the CRF VLAN are not disabled when the DRiP database indicates that another switch has a port configured on the same CRF VLAN.

8. The method of claim 7 further comprising the step of ensuring that only one port of the distributed CRF is active at a time to thereby avoid loop problems associated with active, dual-attached ports.

9. The method of claim 8 further comprising the steps of:

implementing a conflict resolution policy when a port on more than one switch of the distributed CRF is active and configured at the same time; and selecting one port of a switch to be active for the backup CRF VLAN.

10. The method of claim 9 wherein the step of selecting comprises the step of selecting a port of a switch having a smaller medium access control address value.

11. The method of claim 9 wherein the step of selecting comprises the step of selecting a port of a switch having a larger medium access control address value.

12. A system for providing a redundant path for traffic between undistributed Concentrator Relay Functions (CRFs) located on different switches interconnected by trunk links of a distributed token ring (TR) bridge, the system comprising:

a backup network coupled between the switches, the backup network utilized in response to activation of a TR connection when a trunk link within the distributed TR bridge fails, the backup network including a CRF that is distributed among the switches and having only one port active at a time.

13. The system of claim 12 further comprising a backup network path which may be utilized if a primary active path is not a valid path to a backup network.

14. The system of claim 12 wherein a virtual local area network (VLAN) is associated with the distributed CRF, and wherein the distributed CRF and associated VLAN are defined as a backup CRF VLAN by configuring a database of each switch in the distributed TR bridge.

15. The system of claim 14 wherein the database is a distributed ring protocol (DRiP) database having a plurality of entries and wherein the DRiP database is configured to reflect a backup CRF VLAN status by asserting a backup bit for a particular entry.

16. The system of claim 15 wherein assertion of the backup bit denotes that ports on the CRF VLAN are not disabled when the DRiP database indicates that another switch has a port configured on the same CRF VLAN.

17. The system of claim 16 further comprising a DRiP core process for implementing a conflict resolution policy when a port on more than one switch of the distributed CRF is active and configured at the same time, the conflict resolution policy selecting one port of a switch to be active for the backup CRF VLAN.

18. The system of claim 12 wherein the backup network is an ATMLane network.

19. The system of claim 12 wherein the trunk links are interswitch link (ISL) trunk links.

20. The system of claim 17 wherein the conflict resolution policy is based on the medium access control address of each switch.

21. A method for operating a switch, comprising:

connecting a first port of said switch to a trunk link, said trunk link forming a path of a distributed token ring (TR) bridge to provide a path for traffic between an undistributed Concentrator Relay Function (CRF) in said switch and other undistributed Concentrator Relay Functions located on other switches;

providing a second port of said switch to connect to said distributed token ring (TR) bridge to provide a portion of a backup network, said second port having a second undistributed CRF in said switch; and utilizing said second port as a backup port if the primary active port does not connect to a valid path to the network, the backup port providing a path from said switch to said distributed token ring (TR) bridge.

22. The method of claim 21 further comprising:

utilizing the backup network path in response to activation of a TR connection when a trunk link within the distributed TR bridge fails.

23. The method of claim 21 further comprising:

associating a virtual local area network (VLAN) with the distributed CRF; and configuring a database of each switch in the distributed TR bridge to define the distributed CRF and associated VLAN as a backup CRF VLAN.

24. The method of claim 23 further comprising:

manually configuring the DRiP database of each switch in the distributed bridge.

25. The method of claim 23 further comprising:

employing a conventional protocol configured to set up and manage VLANs in a network.

26. The method of claim 23 further comprising:

asserting a backup bit for an entry of the database to reflect a backup CRF VLAN status of the backup CRF VLAN, and the database is a distributed ring protocol (DRiP) database having a plurality of entries.

27. The method of claim 26 further comprising:

denoting that ports on the CRF VLAN are not disabled when the DRiP database indicates that another switch has a port configured on the same CRF VLAN.

28. The method of claim 27 further comprising:

ensuring that only one port of the distributed CRF is active at a time to thereby avoid loop problems associated with active, dual-attached ports.

29. The method of claim 28 further comprising:

implementing a conflict resolution policy when a port on more than one switch of the distributed CRF is active and configured at the same time; and selecting one port of a switch to be active for the backup CRF VLAN.

30. The method of claim 29 further comprising:

selecting a port of a switch having a smaller medium access control address value.

31. The method of claim 29 further comprising:

selecting a port of a switch having a larger medium access control address value.

32. A switch, comprising:

a first port of said switch connected to a trunk link, said trunk link forming a path of a distributed token ring (TR) bridge to provide a path for traffic between an undistributed Concentrator Relay Function (CRF) in said switch and other undistributed Concentrator Relay Functions located on other switches;

a second port of said switch connected to said distributed token ring (TR) bridge to provide a portion of a backup network, said second port having a second undistributed CRF in said switch; and a circuit to utilize said second port as a backup port if the primary active port does not connect to a valid path to the network, the backup port providing a path from said switch to said distributed token ring (TR) bridge.

33. The apparatus of claim 32 further comprising:

a backup network path which may be utilized by said switch if a primary active path is not a valid path to a backup network.

34. The apparatus of claim 32, further comprising:

said switch forming a part of a distributed CRF, a virtual local area network (VLAN) associated said distributed CRF, and the distributed CRF and associated VLAN are defined as a backup CRF VLAN by configuring a database of said switch.

35. The apparatus of claim 34 further comprising:

said database is a distributed ring protocol (DRiP) database having a plurality of entries and the DRiP database is configured ion said switch to reflect a backup CRF VLAN status by asserting a backup bit for a particular entry.

36. The apparatus of claim 35 further comprising:

assertion of the backup bit denotes that ports on the CRF VLAN are not disabled when the DRiP database indicates that another switch has a port configured on the same CRF VLAN.

37. The apparatus of claim 35 further comprising:

a DRiP core process in said switch, said DRiP core process for implementing a conflict resolution policy when a port on more than one switch of the distributed CRF is active and configured at the same time, the conflict resolution policy selecting one port of a switch to be active for the backup CRF VLAN.

38. The apparatus of claim 37 further comprising: the conflict resolution policy is based on the medium access control address of each switch.

39. The apparatus of claim 32 further comprising: the backup network is an ATMLane network.

40. The apparatus of claim 32 further comprising: the trunk links are interswitch link (ISL) trunk links.

41. A switch, comprising:

means for connecting a first port of said switch to a trunk link, said trunk link forming a path of a distributed token ring (TR) bridge to provide a path for traffic between an undistributed Concentrator Relay Function (CRF) in said switch and other undistributed Concentrator Relay Functions located on other switches;

means for providing a second port of said switch to connect to said distributed token ring (TR) bridge to provide a portion of a backup network, said second port having a second undistributed CRF in said switch; and means for utilizing said second port as a backup port if the primary active port does not connect to a valid path to the network, the backup port providing a path from said switch to said distributed token ring (TR) bridge.

42. A computer readable media, comprising:

said computer readable media having instructions for execution on a processor for the practice of the method of claim 1 or claim 21.

43. Electromagnetic signals propagating on a computer network, comprising:

said electromagnetic signals carrying instructions for execution on a processor for the practice of the method of claim 1 or claim 21.

44. A method for operating a switch, comprising:

connecting a first port of said switch to a trunk link, said trunk link forming a path of a distributed token ring (TR) bridge to provide a path for traffic between an undistributed Concentrator (CRF) in said switch and other undistributed Concentrators located on other switches;

providing a second port of said switch to connect to said distributed token ring (TR) bridge to provide a portion of a backup network, said second port having a second undistributed CRF in said switch; and utilizing said second port as a backup port if the primary active port does not connect to a valid path to the network, the backup port providing a backup network path from said switch to said distributed token ring (TR) bridge.

45. The method of claim 44 further comprising:

using a concentrator relay function in the switch as the concentrator, the concentrator relay function described in the IEEE 802.5 standard.

46. The method of claim 44 further comprising:

utilizing the backup network path in response to activation of a TR connection when a trunk link within the distributed TR bridge fails.

47. The method of claim 44 further comprising:

associating a virtual local area network (VLAN) with the distributed CRF; and configuring a database of each switch in the distributed TR bridge to define the distributed CRF and associated VLAN as a backup CRF VLAN.

48. The method of claim 44 further comprising:

manually configuring a DRIP database of each switch in the distributed bridge.

49. The method of claim 44 further comprising:

employing a conventional protocol configured to set up and manage VLANs in a network.

50. The method of claim 44 further comprising:

asserting a backup bit for an entry of the database to reflect a backup CRF VLAN status of the backup CRF VLAN, and the database is a distributed ring protocol (DRiP) database having a plurality of entries.

51. The method of claim 44 further comprising:

denoting that ports on the CRF VLAN are not disabled when the DRiP database indicates that another switch has a port configured on the same CRF VLAN.

52. The method of claim 44 further comprising:

ensuring that only one port of the distributed CRF is active at a time to thereby avoid loop problems associated with active, dual-attached ports.

53. A method for operating a switch, comprising:

connecting a first port of said switch to a trunk link, said trunk link forming a path of a distributed token ring (TR) bridge to provide a path for traffic between an undistributed Concentrator (CRF) in said switch and other undistributed Concentrators located on other switches;

providing a second port of said switch to connect to said distributed token ring (TR) bridge to provide a portion of a backup network, said second port having a second undistributed CRF in said switch;

utilizing said second port as a backup port if the primary active port does not connect to a valid path to the network, the backup port providing a backup network path from said switch to said distributed token ring (TR) bridge; and utilizing the backup network path in response to activation of a TR connection when a trunk link within the distributed TR bridge fails.

54. The method of claim 53 further comprising:

using a concentrator relay function in the switch as the concentrator, the concentrator relay function described in the IEEE 802.5 standard.

55. A switch, comprising:

a first port of said switch connected to a trunk link, said trunk link forming a path of a distributed token ring (TR) bridge to provide a path for traffic between an undistributed Concentrator (CRF) in said switch and other undistributed Concentrators located on other switches;

a second port of said switch connected to said distributed token ring (TR) bridge to provide a portion of a backup network, said second port having a second undistributed CRF in said switch; and a circuit to utilize said second port as a backup port if the primary active port does not connect to a valid path to the network, the backup port providing a path from said switch to said distributed token ring (TR) bridge.

56. The apparatus as in claim 55, further comprising:

the concentrator is a concentrator relay function in the switch, the concentrator relay function described in a IEEE 802.5 standard.

57. The apparatus of claim 55 further comprising:

a backup network path which may be utilized by said switch if a primary active path is not a valid path.

58. The apparatus of claim 55, further comprising:

said switch forming a part of a distributed CRF, a virtual local area network (VLAN) associated said distributed CRF, and the distributed CRF and associated VLAN are defined as a backup CRF VLAN by configuring a database of said switch.

59. The apparatus of claim 58 further comprising:

said database is a distributed ring protocol (DRiP) database having a plurality of entries and the DRiP database is configured ion said switch to reflect a backup CRF VLAN status by asserting a backup bit for a particular entry.

60. The apparatus of claim 55 further comprising:

assertion of the backup bit denotes that ports on the CRF VLAN are not disabled when the DRiP database indicates that another switch has a port configured on the same CRF VLAN.

61. The apparatus of claim 55 further comprising:

a DRIP core process in said switch, said DRIP core process for implementing a conflict resolution policy when a port on more than one switch of the distributed CRF is active and configured at the same time, the conflict resolution policy selecting one port of a switch to be active for the backup CRF VLAN.

62. The apparatus of claim 55 further comprising:

the conflict resolution policy is based on the medium access control address of each switch.

63. The apparatus of claim 55 further comprising:

the backup network is an ATMLane network.

64. The apparatus of claim 55 further comprising:

the trunk links are interswitch link (ISL) trunk links.

65. A switch, comprising:

a first port of said switch connected to a trunk link, said trunk link forming a path of a distributed token ring (TR) bridge to provide a path for traffic between an undistributed Concentrator (CRF) in said switch and other undistributed Concentrators located on other switches;

a second port of said switch connected to said distributed token ring (TR) bridge to provide a portion of a backup network, said second port having a second undistributed CRF in said switch;

a circuit to utilize said second port as a backup port if the primary active port does not connect to a valid path to the network, the backup port providing a backup network path from said switch to said distributed token ring (TR) bridge; and a circuit to utilize the backup network path in response to activation of a TR connection when a trunk link within the distributed TR bridge fails.

66. A switch, comprising:

means for connecting a first port of said switch to a trunk link, said trunk link forming a path of a distributed token ring (TR) bridge to provide a path for traffic between an undistributed Concentrator (CRF) in said switch and other undistributed Concentrators located on other switches;

means for providing a second port of said switch to connect to said distributed token ring (TR) bridge to provide a portion of a backup network, said second port having a second undistributed CRF in said switch; and means for utilizing said second port as a backup port if the primary active port does not connect to a valid path to the network, the backup port providing a backup network path from said switch to said distributed token ring (TR) bridge.

67. The apparatus of claim 66 further comprising:

means for using a concentrator relay function in the switch as the concentrator, the concentrator relay function described in the IEEE 802.5 standard.

68. The apparatus of claim 66, further comprising:

means for utilizing the backup network path in response to activation of a TR connection when a trunk link within the distributed TR bridge fails.

69. A computer readable media, comprising:

said computer readable media having instructions for execution on a processor for the practice of the method of claim 44 or claim 53.

70. Electromagnetic signals propagating on a computer network, comprising:

said electromagnetic signals carrying instructions for execution on a processor for the practice of the method of claim 44 or claim 53.

* * * * *